G. L. WITSIL.
Churn.
No. 40,450.
Patented Oct. 27, 1863.
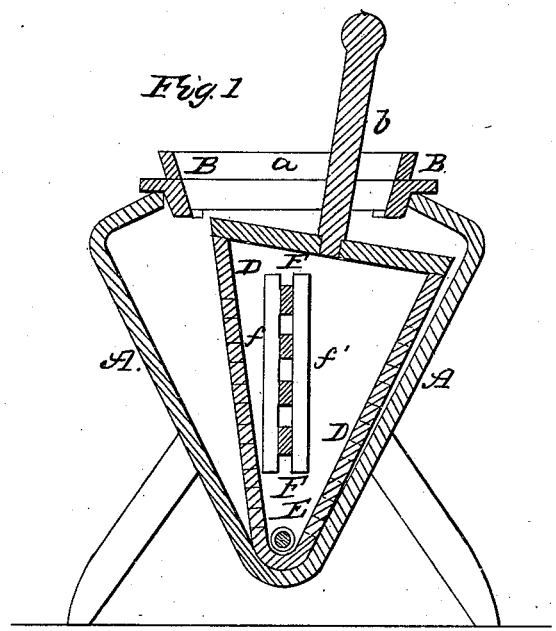
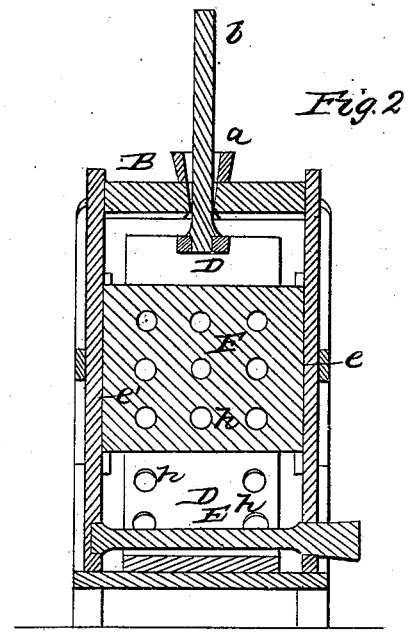
WITNESSES
W. Albert Steel
Charles Howson
INVENTOR
Henry Howson
Atty for
G. L. Witsil

UNITED STATES PATENT OFFICE.

GEORGE L. WITSIL, OF PHILADELPHIA, PENNSYLVANIA, ASSIGNOR TO HIMSELF AND CLEMENT CRESSON, OF SAME PLACE.

IMPROVEMENT IN CHURNS.

Specification forming part of Letters Patent No. 40,450, dated October 27, 1863.

*To all whom it may concern:*

Be it known that I, G. L. WITSIL, of Philadelphia, Pennsylvania, have invented an Improvement in Churns; and I do hereby declare the following to be a full, clear, and exact description of the same, reference being had to the accompanying drawings, and to the letters of reference marked thereon.

My invention consists of a reservoir for containing the cream, a perforated dasher to which a vibrating motion is imparted, and a detachable perforated board, the whole being formed, arranged, and operating substantially as described hereinafter, so as to thoroughly agitate the cream, permit a plentiful supply of air to have access to the same, and thereby produce the butter in a very short space of time.

My invention further consists of a pin so adapted to the said reservoir and so arranged in respect to the dasher that it will serve to maintain the latter in its place and act as a plug, the withdrawal of which permits the buttermilk to escape.

In order to enable others skilled in this class of mechanism to make and use my invention, I will now proceed to describe its construction and operation.

On reference to the accompanying drawings, which form a part of this specification, Figure 1 is a vertical section of my improved churn, and Fig. 2 a transverse vertical section of the same.

A is the trough or reservoir for containing the cream, and is of the V-shaped form represented in Fig. 1, a detachable cover, B, being fitted to the top of the reservoir, and this cover having an elongated slot, $a$, through which passes the handle $b$ of the V-shaped dasher D. The lower end of this dasher is rounded and arranged to fit snugly in the concave termination of the interior of the reservoir.

A pin, E, passing entirely through one side, $e$, of the reservoir, and fitting into a recess in the opposite side, $e'$, of the same, serves to maintain the V-shaped dasher in its place, and also acts as a plug, as the withdrawal of the pin enables the buttermilk to escape from the reservoir.

A perforated board, F, is fitted in the middle of the reservoir, between guide-pieces $f$ and $f'$, attached to the sides $e$ and $e'$, this board being so arranged that it can be removed and replaced at pleasure.

It will be observed that the two sides of the V-shaped dasher are perforated with a number of holes, $h$.

The cream having been deposited in the reservoir, the handle $b$ is grasped by the hand of the operator and a rapid vibrating motion is imparted to the dasher, which is brought in contact or nearly in contact first with one inclined side, and then with the other inclined side of the reservoir. The cream by this movement of the dasher is forced backward and forward through the perforations of the stationary board F, as well as through those of the dasher itself. The globules of butter are thus broken up and reduced to the desired mass with remarkable rapidity, as I have ascertained by many practical tests. This rapidity in producing the butter is in a great measure owing to the access of a plentiful supply of air to the cream, for when the latter is moved to one inclined side of the reservoir by the dasher the air rushes into the opposite side of the reservoir, and on the return movement of the dasher this air is thoroughly mixed with the cream.

When the butter has been formed, the pin or plug $e$ is withdrawn, and the buttermilk permitted to escape.

The cover B is then removed, and the dasher, together with the perforated board F, and the butter are raised from the reservoir.

It will be readily seen that every facility is afforded for the thorough cleansing of the interior of the reservoir, the dasher, and perforated board.

I claim as my invention and desire to secure by Letters Patent—

1. The reservoir A, perforated dasher D, and detachable perforated board F, the whole being formed, arranged, and operating substantially as and for the purpose specified.

2. The pin E, so fitted to the reservoir as to form a plug, and arranged in respect to the vibrating dasher as described, for the purpose set forth.

In testimony whereof I have signed my name to this specification in the presence of two subscribing witnesses.

GEO. L. WITSIL.

Witnesses.
HENRY HOWSON,
JOHN WHITE.